(12) United States Patent
Hatta

(10) Patent No.: US 6,798,831 B1
(45) Date of Patent: Sep. 28, 2004

(54) TESTING SYSTEM

(75) Inventor: Koichi Hatta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 09/709,317

(22) Filed: Nov. 13, 2000

(30) Foreign Application Priority Data

Apr. 18, 2000 (JP) ........................................ 2000-116999

(51) Int. Cl.[7] .......................... H04B 17/00; H04B 3/46; H04Q 1/20
(52) U.S. Cl. ........................ 375/224; 375/373; 375/375
(58) Field of Search ................................ 395/224, 371, 395/373, 375, 376; 713/400, 600

(56) References Cited

U.S. PATENT DOCUMENTS 4,823,360 A * 4/1989 Tremblay et al. ........... 375/214
4,862,484 A * 8/1989 Roberts ...................... 375/376
6,353,604 B2 * 3/2002 Grimwood et al. ......... 370/335
6,633,605 B1 * 10/2003 Katsman et al. ............ 375/226

* cited by examiner

Primary Examiner—Phoung Phu
(74) Attorney, Agent, or Firm—Staas & Halsey LLP

(57) ABSTRACT

A testing system is provided with a pseudo random number generating circuit which generates a pseudo random number on the basis of a 125 MHz clock output from a 5-multiply circuit inside a clock recovery circuit, and an expected value generating/comparator circuit which collates a 125 Mbps recovered data output from the clock recovery circuit with an expected value data each 5 bits, and outputs the collation result as a 1-bit test output. The clock recovery circuit and the testing system are provided on the same LSI and are operated at a 125 MHz high frequency clock. However, the clock recovery circuit outputs a test output as recognized as a 25 MHz low speed data in the outside of LSI to the external elements.

22 Claims, 15 Drawing Sheets

FIG.13

| INPUT CONDITION | TEST OUTPUT |
|---|---|
| START SIGNAL=1 | 0 |
| RECOVERED DATA=010001110001001 | 1 |
| RECOVERED DATA=011100000011001 | 0 |
| RECOVERED DATA=001001101110010 | 1 |
| RECOVERED DATA=000010101101101 | 1 |
| RECOVERED DATA=011001011000011 | 0 |
| RECOVERED DATA=111011011110101 | 0 |
| RECOVERED DATA=110100010000110 | 1 |
| RECOVERED DATA=110001111001110 | 0 |
| RECOVERED DATA=011000101101001 | 1 |
| RECOVERED DATA=000101001010100 | 1 |
| RECOVERED DATA=111011101100111 | 0 |
| RECOVERED DATA=101111110100110 | 0 |
| RECOVERED DATA=011010100011000 | 1 |
| RECOVERED DATA=001110101010111 | 0 |
| RECOVERED DATA=110010100001001 | 1 |
| RECOVERED DATA=111111100001011 | 1 |
| RECOVERED DATA=110001101000000 | 0 |
| OTHERS | HOLDING THE PREVIOUS VALUE |

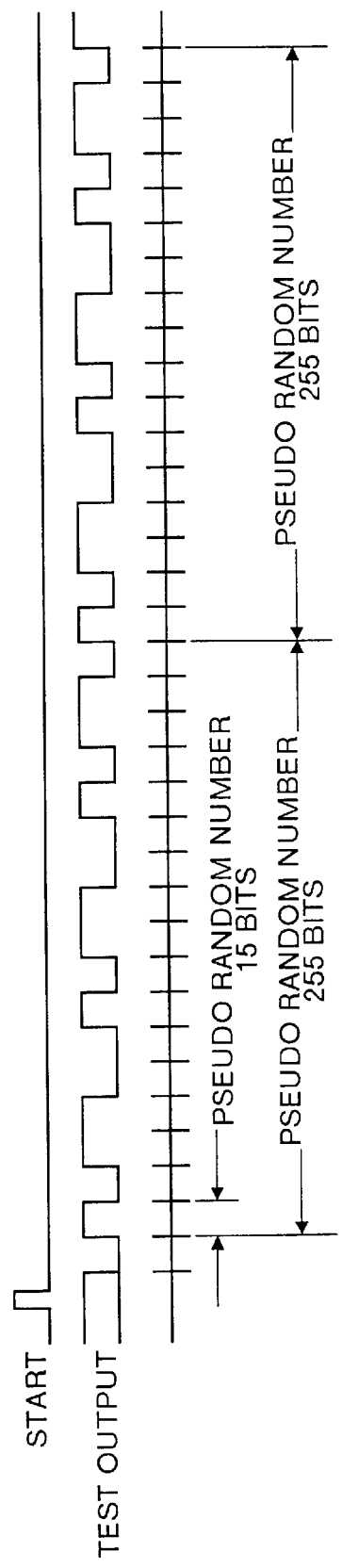

TESTING SYSTEM

FIELD OF THE INVENTION

The present invention relates to a system for testing the state of a clock recovered regenerated on the basis of a digital data input from the outside.

BACKGROUND OF THE INVENTION

In digital communication, in order to reduce the number of signals to be transmitted, sometimes, only information data is transmitted from the sender to the receiver. In such a case, the receiver executes a clock recovery processing in which a clock is regenerating on the basis of the received information data. Thus, there is a need of making a test by the LSI at the receiving side so as to check whether the clock recovery operation has been normally carried out.

The following is a description on a clock recovery circuit and its operation, and a conventional testing system for testing the clock recovery circuit. For convenience of explanation, is it assumed here that the input data is a 1-bit data having 125 Mbps, and a frequency of a clock source is 25 MHz.

FIG. 1 is a block diagram showing a construction of a conventional clock recovery circuit. This clock recovery circuit 1 includes a 5-muliply circuit 11, a phase control circuit 12, a phase error detector circuit 13, an integration circuit 14 and a sampling circuit 15. The 5-muliply circuit 11 5-multiplies (i.e. increases the signal to a value which is five times more than its original value) a 25 MHz clock supplied from a clock source (not shown) so as to generate a 125 MHz clock. This 5-multiply circuit may be a PLL circuit. The phase error detector circuit 13 detects a time lag between a falling edge of the 125 MHz clock generated by the 5-multiply circuit 11 and a change point of a 125 Mbps input data. The integration circuit 14 integrates a time lag detected by the phase error detector circuit 13.

The phase control circuit 12 controls the phase of the 125 MHz clock generated by the 5-multiply circuit 11 on the basis of the integration by the integrating circuit 14 so that the falling edge of the 125 MHz clock and the change point of a 125 Mbps input data coincide with each other. The sampling circuit 15 samples the input data at a falling edge of the 125 MHz clock phase-controlled by the phase control circuit 12. A recovered clock is obtained by 5-multiplying a 25 MHz clock, and by synchronizing it with a 125 MBPS input data. A recovered data is obtained by sampling the 125 Mbps input data on the basis of the recovered clock thus obtained.

FIG. 2 is a timing chart showing operation timing of the clock recovery circuit shown in FIG. 1. As shown in FIG. 2, the phase of the recovered clock advances with respect to the input data D11 and D12. In order to overcome this problem, the phase of the recovered clock is controlled so as to be delayed. Moreover, the phase of the recovered clock is delayed with respect to the input data D13 and D14. In order to overcome this problem, the phase of the recovered clock is controlled so as to be advanced.

The phase of the recovered clock is controlled so as to be delayed with respect to the input data D15. The legends D21, D22, D23, D24 and D25 denote a recovered data corresponding to respective input data D11, D12, D13, D14 and D15.

As a method of testing a clock recovery operation of an LSI used in a receiving side device, there is an asynchronous test of building up a test environment close to an actual operating environment, and carrying out a test. Moreover, as another testing method, there is a synchronous test of synchronizing a clock recovery operation, and carrying out a test on an LSI tester using a test pattern.

FIG. 3 is a block diagram showing a construction of a conventional asynchronous testing system. This asynchronous testing system comprises a data source 21, a data supply device 22, a 25 MHz clock source 23, a comparator device 24 and a frequency measuring device 25. A clock recovery circuit 1 shown in this figure is the test object. The clock recovery circuit 1 is a circuit having a construction shown in FIG. 1.

The data source 21 has an input data that is to be input into the clock recovery circuit 1. The data supply device 22 supplies the input data of the data source 21 at a 125 Mbps, or in a state that a frequency deviation and jitter are added to the clock recovery circuit 1. The 25 MHz clock source 23 supplies a 25 MHz clock to the clock recovery circuit 1. The comparator device 24 makes a comparison between a recovered data output from the clock recovery circuit 1 and the input data of the data source 21.

The frequency measuring device 25 measures a frequency of a recovered clock outputted from the clock recovery circuit 1. When the comparison of the recovered data and the input data shows that the two match with each other further, when the measured frequency of the recovered clock coincides with the frequency of the input data, then it is decided that the clock recovery circuit 1 is working normal.

Next, an explanation will be given about the synchronous test. In the synchronous test, a 125 Mbps clock is supplied directly to the clock recovery circuit which is a test object, at a test pattern. Moreover, a 125 Mbps input data is supplied directly to the clock recovery circuit at a test pattern. Then, a confirmation is made whether or not a recovered data outputted from the clock recovery circuit coincides with a test pattern of the input data inputted to the clock recovery circuit. If the recovered data and the test pattern coincide with each other, a decision is made that the clock recovery circuit 1 is working normal.

There is a drawback in the aforesaid conventional asynchronous test that a storage device for storing the input data, a comparator device and the like are required. Accordingly, the structure of the testing system complicated. Moreover, in order to measure a frequency of recovered clock, a number of pulses in a predetermined time must be measured. For this reason, there is a problem that a testing time becomes long.

On the other hand, in the aforesaid synchronous test, an LSI tester operable at frequency as high as a 125 MHz is required. However, a high speed LSI tester having an operating frequency of 100 MHz or more is very expensive. For this reason, in general, there is a problem that it is difficult to use many high speed LSI testers, and a testing cost becomes high.

SUMMARY OF THE INVENTION

It is an object of the present invention to provide a recovered clock testing system which can test a high frequency clock recovery operation using a cheap low speed LSI tester with respect to an LSI used in a receiving side of digital communication.

The testing system according to the present invention comprises a delay circuit which holds a 10-bit data of a 125 Mbps recovered data outputted from a clock recovery unit, an adder circuit which operates the total sum of 10 data held in the delay circuit, a edge detection circuit which detects a change of the recovered data, and a 4-bit flip-flop circuit which samples the operation result of the adder circuit when the recovered data changes, and outputs it as a test result.

Further, the present invention provides a testing system including a pseudo random number generating circuit which generates a pseudo random number on the basis of a 125 MHz clock outputted from a clock multiply circuit included in a clock recovery circuit, and an expected value generating/comparator circuit which collates a 125 Mbps recovered data outputted from the clock recovery circuit 1 with an expected value data each 5 bits or 15 bits, and then, outputs the collation result as a 1-bit test output According to the invention, the clock recovery circuit and the testing system included in the LSI are operated by a 125 MHz high frequency clock, however, a test output is a 25 MHz low speed data in the light of the outside of LSI. All recovered data information are reflected in the test output.

Other objects and features of this invention will become apparent from the following description with reference to the accompanying drawings.

BRIEF DESCRIPTION OF THE DRAWINGS

FIG. 13 is a table showing a relation between a 15-bit recovered data and a test output in the expected value generating/comparator circuit;

FIG. 15 is a timing chart showing the whole periods of a pseudo random number outputted from the pseudo random number generating circuit in the case of comparing a recovered data and an expected value each 15 bits.

DESCRIPTION OF THE PREFERRED EMBODIMENTS

Two preferred embodiments of the testing system according to the present invention will be described in detail below with reference to the accompanying drawings.

Figure 1:
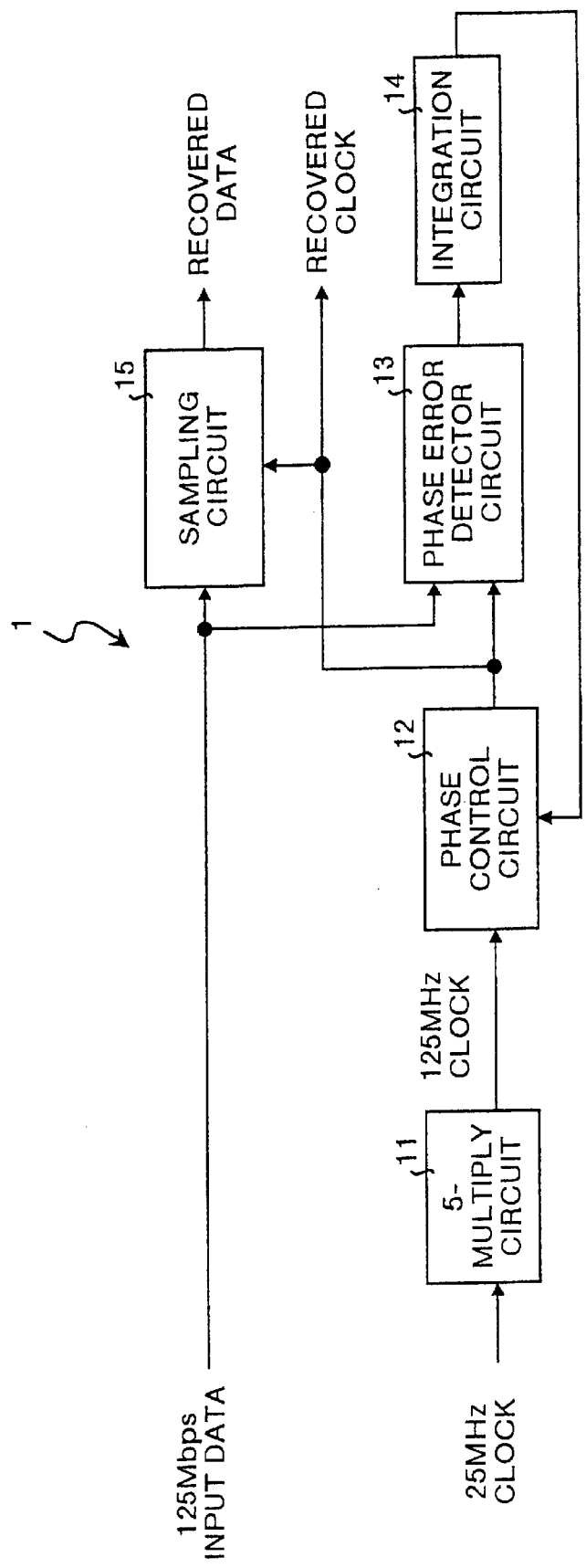
FIG. 1 is a block diagram showing a construction of a conventional clock recovery circuit.
Figure 2:
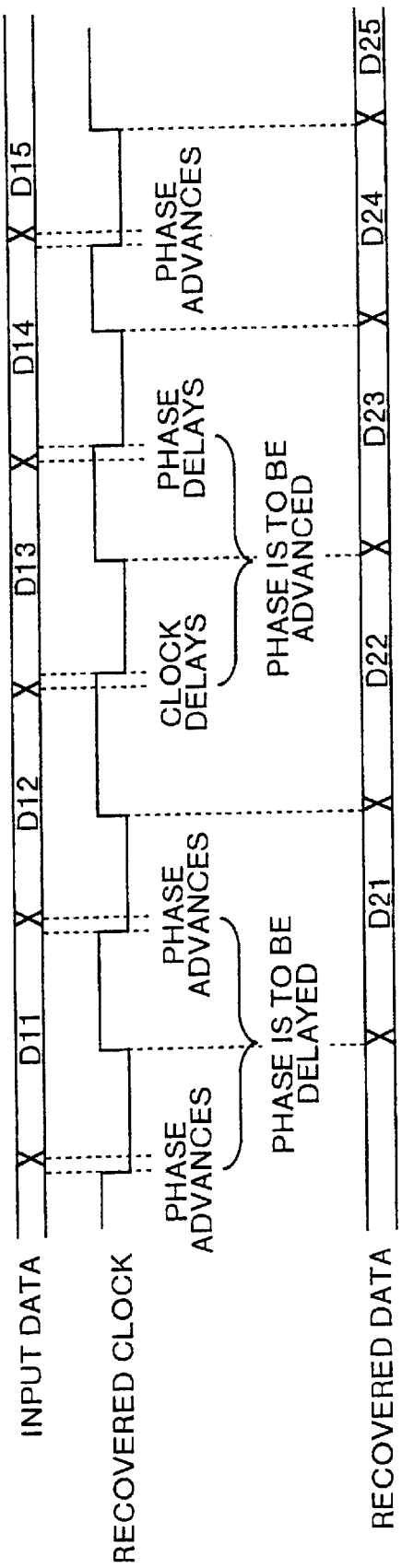
FIG. 2 is a timing chart showing an operating timing of the clock recovery circuit shown in FIG. 1.
Figure 3:
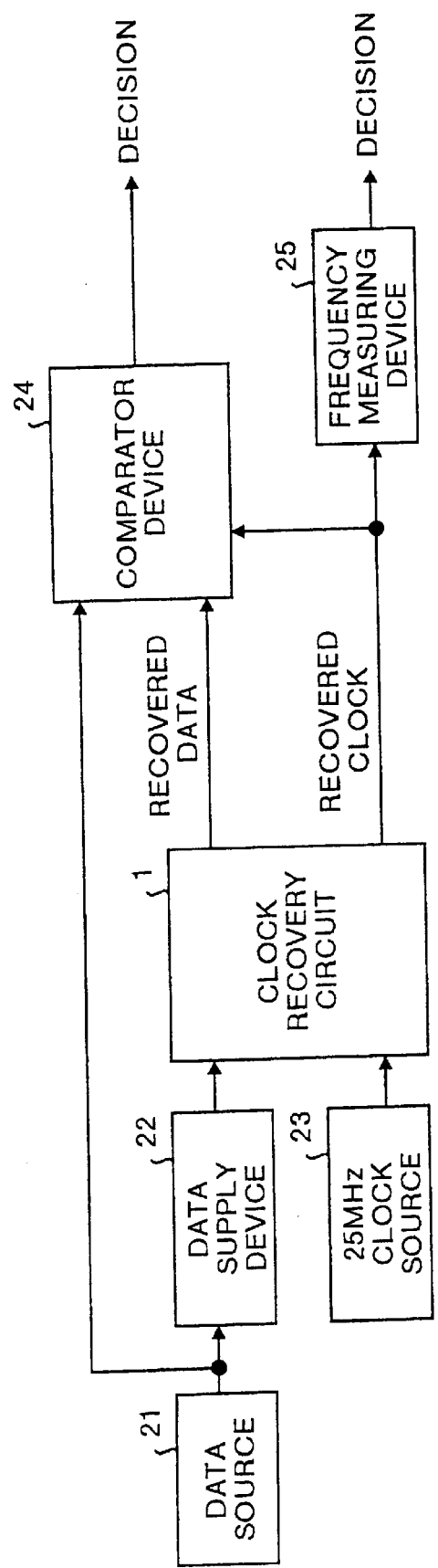
FIG. 3 is a block diagram showing a construction of a conventional asynchronous testing system.
Figure 4:
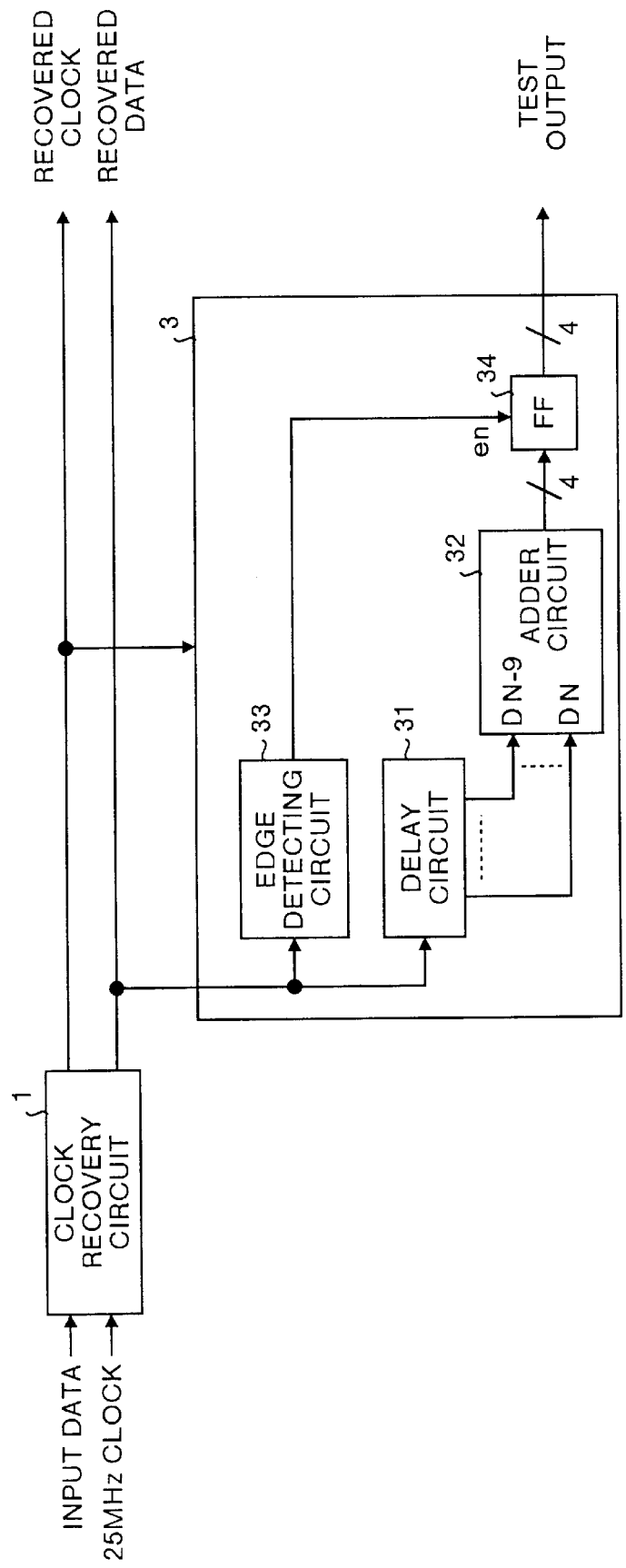
FIG. 4 is a block diagram showing a construction of a system for testing an operation of a clock recovery circuit using a testing system according to a first embodiment of the present invention.

FIG. 4 is a block diagram showing a construction of a system for testing an operation of a clock recovery circuit using a testing system according to a first embodiment of the present invention. For example, the clock recovery circuit 1 is a circuit having the construction shown in FIG. 1. A 25 MHz clock at a test pattern and a 25 Mbps input data synchronizing with the 25 MHz clock at a test pattern are supplied to the clock recovery circuit 1 from the outside of LSI. The clock recovery circuit 1 outputs a 125 MHz recovered clock and a 125 Mbps recovered data. The 25 Mbps input data is equivalent to a 125 Mbps data such that the same value continues at a 5-bit unit.

A testing system 3 is provided in the same LSI as the clock recovery circuit 1 which is a test object, and includes a delay circuit 31, an adder circuit 32, a edge detection circuit 33 and a 4-bit flip-flop circuit (FF) 34. The testing system 3 is driven by a recovered clock supplied from the clock recovery circuit 1.

The delay circuit 31 comprises a 10-stage shift resistor for storing a recovered data outputted from the clock recovery circuit 1, for example, a 10-clock data, although it is not specially limited in its number. Each stage flip-flop circuit constituting the shift register is operated by a recovered clock. The delay circuit 31 outputs a data stored in each stage flip-flop circuit.

The adder circuit 32 operates (calculates) the total sum of 10 data (DN to DN-9) outputted from each stage of the delay circuit 31. The edge detection circuit 33 detects a change of a recovered data outputted from the clock recovery circuit 1, and then, outputs an enable signal en. The edge detection circuit 33 is operated by a recovered clock.

In the 4-bit flip-flop circuit 34, its content is updated in synchronous with a rise edge of recovered clock when an enable signal en supplied from the edge detection circuit 33 is "1". Further, the 4-bit flip-flop circuit 34 samples and outputs an operation result of the adder circuit 32 when the recovered data outputted from the clock recovery circuit 1. This output is a test result.

Figure 5:
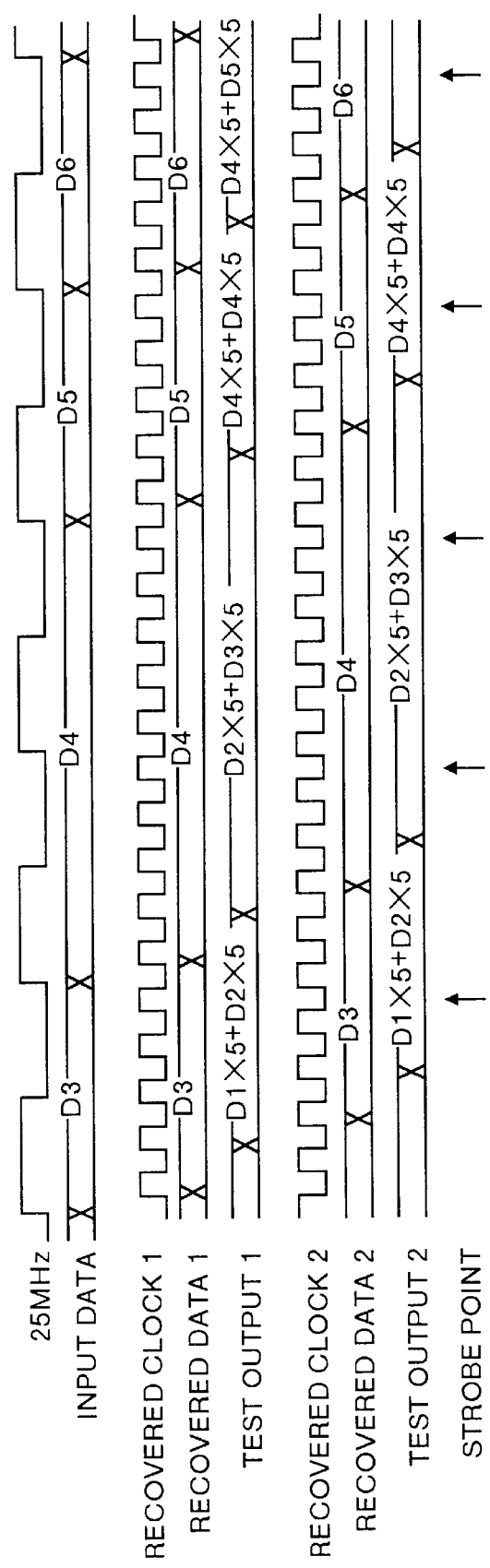
FIG. 5 is a timing chart showing an operation timing of the testing system according to the first embodiment.

Next, operation of the testing system according to the first embodiment will be explained. FIG. 5 is a timing chart showing an operating timing of the testing system according to this first embodiment. A 25 MHz clock is supplied to the clock recovery circuit 1 at a test pattern. Moreover, a 25 Mbps input data synchronizing with the 25 MHz, that is, a 125 Mbps data having the same value continuing at a unit of 5-bit is supplied to the clock recovery circuit 1 at a test pattern.

In FIG. 5, each input data of D3, D5 and D6 is equivalent to a 125 Mbps data having the same value continuing at a unit of 5-bit. An input data of D4 is equivalent to a 125 Mbps data having the same value continuing at a unit of 10-bit. The clock recovery circuit 1 outputs a 125 MHz recovered clock and a 125 Mbps recovered data. In FIG. 5, each of a recovered clock 1 and a recovered data 1 shows a timing in the case of being outputted at a small delay with respect to a 25 MHz clock, and each of a recovered clock 2 and a recovered data 2 shows a timing in the case where a delay is large.

In the testing system 3, a continuous 10-bit data of the 125 Mbps recovered data output from the clock recovery circuit 1, that is, the sum of two 25 Mbps data are operated. If the two 25 Mbps data thus added are both zero "0", ten (10) 125 Mbps data having a logic "0" (zero) are added; therefore, the operation result is "0" (zero). If the two 25 Mbps data thus added are both "1", ten logic "1" are added; therefore, the operation result is 10. If the 25 Mbps data is "0" (zero) and "1", the logic "0" and "1" are added five by fine; therefore, the operation result is 5.

The testing system 3 samples the aforesaid operation result when the 125 Mbps recovered data changes. Then, the sampling value is output as a test output from the testing system 3. The recovered data is 25 Mbps data in the light of the outside of LSI; as a result, the test output also becomes a 25 Mbps data.

In this case, a jitter is generated in a recovered clock by an influence of the 5-multiply circuit (PLL circuit) and the phase control circuit in the clock recovery circuit 1. A jitter is also generated in a recovered data and in a change point of the test output. In order to avoid the vicinity of each change point of test outputs 1 and 2 corresponding individually to the recovered data 1 and 2, an expected value collation by the test pattern is carried out at a timing (strobe point:position shown by an arrow of the lowest portion in FIG. 5) when a test output value is settled.

Figure 6:
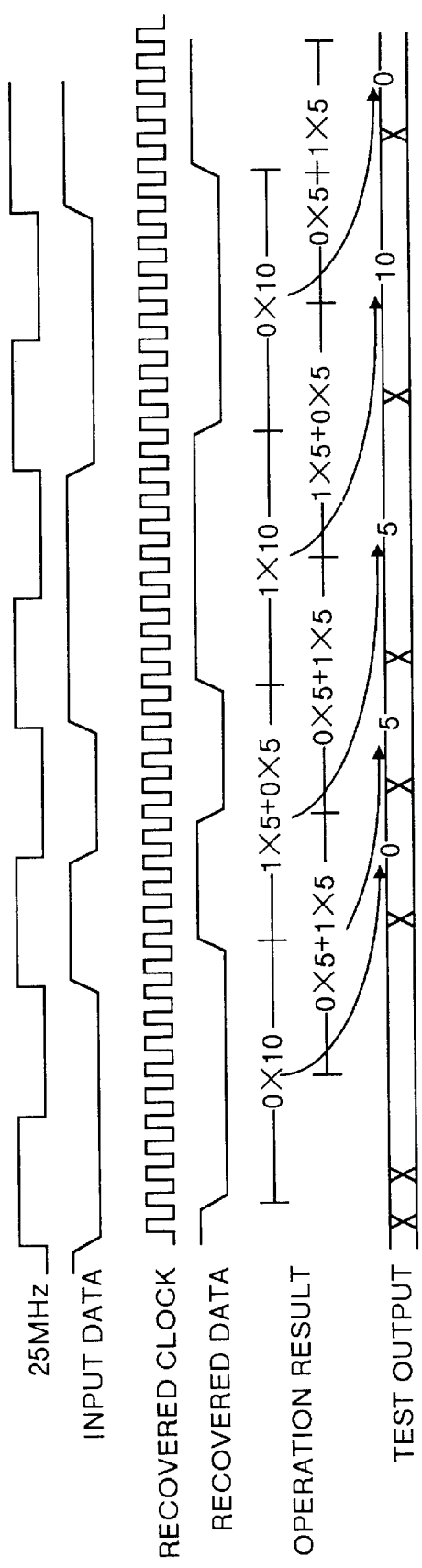
FIG. 6 is a timing chart showing a state that a clock recovery operation is normal in the operation timing of the testing system according to the first embodiment.

FIG. 6 is a timing chart showing a case when the clock recovery operation is normal in an operation timing of the testing system according to the first embodiment. Whenever the recovered data changes, a 10 bit of the 125 Mbps recovered data is added, and then, the result thus added is output as a test output. When the clock recovery operation is normal, the recovered data is a data such that the same value continues five bit each; for this reason, the test output value is either "0" (zero), 5 or 10. Therefore, the value of "0" (zero), 5 or 10 is accurately output as the test output value correspondingly to an input data, a decision is made that the clock recovery operation is normal.

Figure 7:
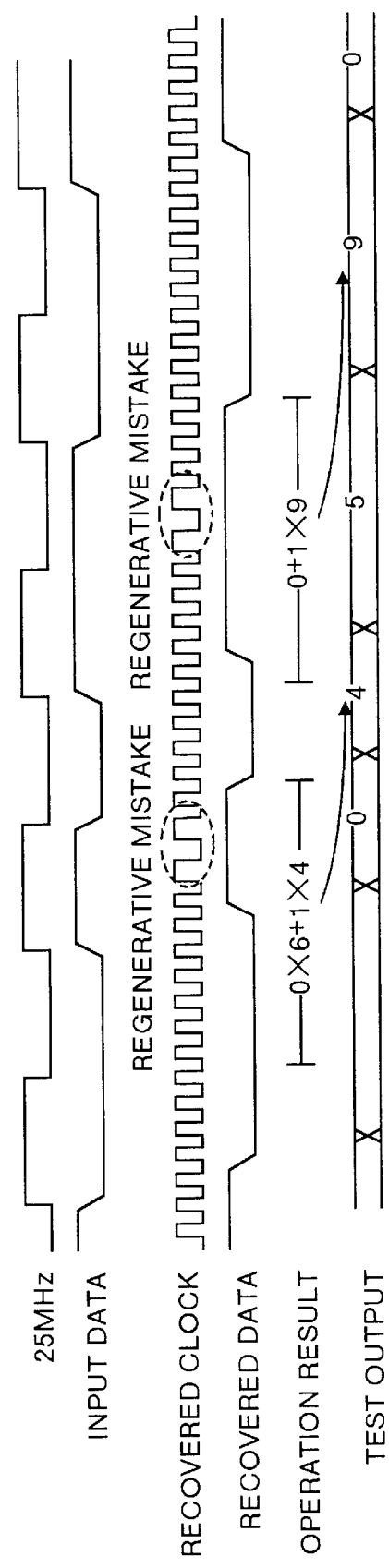
FIG. 7 is a timing chart showing a state that a clock recovery operation is abnormal in the operation timing of the testing system according to the first embodiment.

FIG. 7 is a timing chart showing a case when the clock recovery operation is abnormal in an operation timing of the testing system according to the first embodiment. Abnormal clock recovery operation means that the recovered data does not become a data such that the same value continues five bit each. For this reason, the test output value becomes values other than "0" (zero), 5 or 10.

For example, as shown in FIG. 7, the test output value becomes 4 because of the first clock regeneration mistake, and then, becomes 9 because of the next clock regeneration mistake. Therefore, unless the value of "0" (zero), 5 or 10 is accurately output as the test output value correspondingly to an input data, a decision is made that the clock recovery operation is abnormal. In other words, a decision is made that the LSI is defective.

According to the first embodiment, inside the LSI, that is, the clock recovery circuit 1 and the testing system 3, the components are operated at a 125 MHz clock, however, when view from outside, the test output is a 25 Mbps data. Further, all recovered data information are reflected in the test output. Therefore, it is possible to test a 125 MHz clock recovery operation by using an LSI tester operating at 25 MHz.

It is explained above that the 25 MHz clock is 5-multiplied, and then, 10 bit is added to the 125 Mbps recovered data. However, the present invention is not limited to this. Further, a clock supplied to the clock recovery circuit is also not limited to 25 MHz. Further, the clock multiplication factor is not limited to 5. Also, the number of bits to be added is not limited to 10 bit. The test output value changes in accordance with the number of bit to be added; therefore, the flip-flop circuit 34 outputting the test result has the number of bits corresponding to the test output value.

Figure 8:
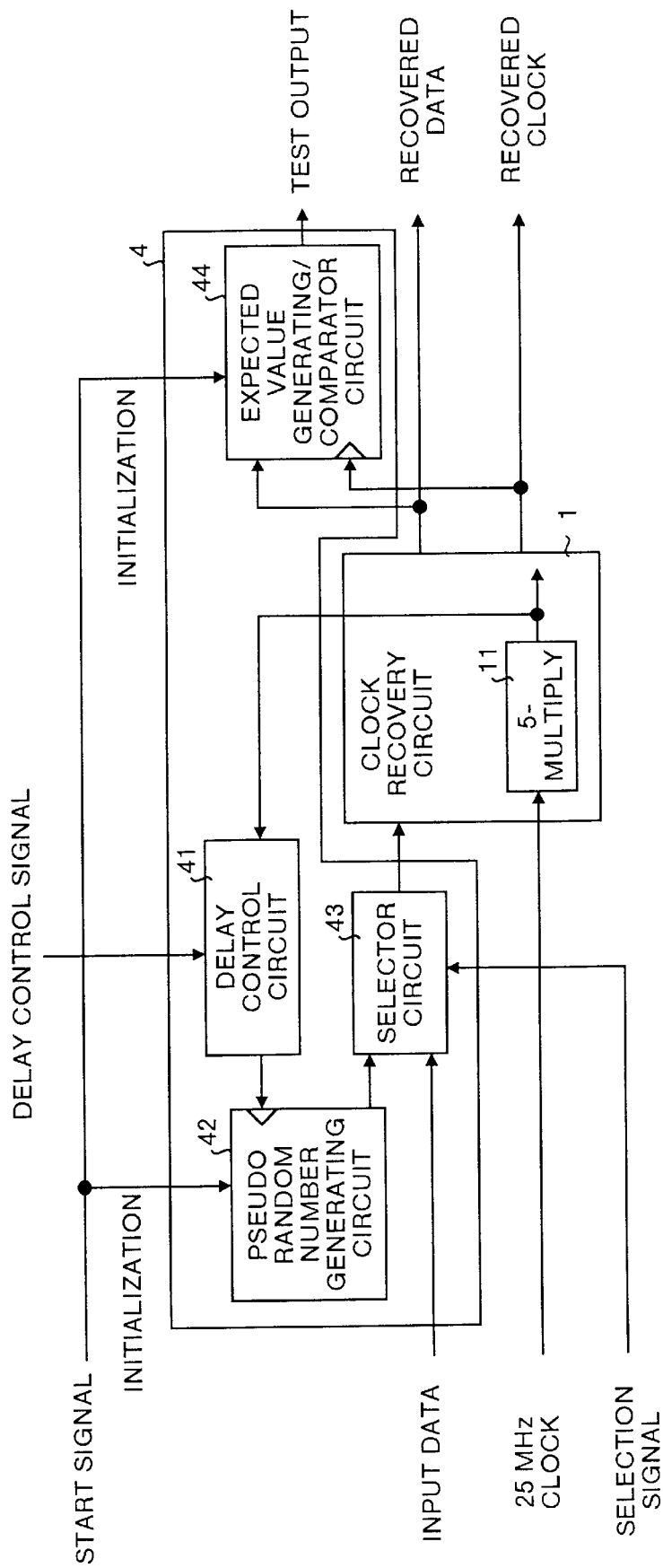
FIG. 8 is a block diagram showing a construction of a system for testing an operation of a clock recovery circuit using a testing system according to a second embodiment of the present invention.

FIG. 8 is a block diagram showing a construction of a system for testing an operation of a clock recovery circuit using a testing system according to a second embodiment of the present invention. For example, the clock recovery circuit 1 is a circuit having the construction shown in FIG. 1. A 25 MHz clock and a 125 Mbps are supplied from a testing system 4 to the clock recovery circuit 1 at a test pattern. The clock recovery circuit 1 outputs a 125 MHz recovered clock and a 125 Mbps recovered data.

The testing system is provided in the same LSI as the clock recovery circuit which is a test object, and includes a delay control circuit 41, a pseudo random number generating circuit 42, a selector circuit 43 and an expected value generating/comparator circuit 44. A 125 MHz clock is supplied to the testing system 4 from the 5-multiply circuit 11 in the clock recovery circuit 1. The delay control circuit 41 delays the 125 MHz clock supplied from the 5-multiply circuit 11 with an arbitrary delay within 1 cycle on the basis of a delay control signal, and then, outputs it. The delay control signal is supplied from the outside of LSI.

The pseudo random number generating circuit 42 generates and outputs a pseudo random number such as an M-series code. Further, the pseudo random number generating circuit 42 is operated at the 125 MHz clock outputted from the delay control circuit 41. Moreover, the pseudo random number generating circuit 42 is initialized when a start signal is inputted thereto so that a pseudo random number is returned to the initial value. The start signal is synchronous with the 25 MHz clock, and is supplied from the outside of LSI.

The selector circuit 43 selects a data supplied to the clock recovery circuit 1 on the basis of a selection signal. When testing the clock recovery operation of the clock recovery circuit 1, the selector circuit 43 selects an output data of the pseudo random number generating circuit 42, and then, supplies the selected output data to the clock recovery circuit 1. On the other hand, during normal operation, the selector circuit 43 selects a data received in a digital communication, for example, a 125 Mbps input data, and then, supplies the input data to the clock recovery circuit 1. The above selection signal is supplied from the outside of LSI.

The expected value generating/comparator circuit 44 generates an expected value data for making a collation with a recovered data outputted from the clock recovery circuit 1. Further, the expected value generating/comparator circuit 44 is initialized when the above start signal is inputted. The expected value data is the same as a pseudo random number generated by the pseudo random number generating circuit 42. Moreover, the expected value generating/comparator circuit 44 collates the expected value data thus generated with the 125 Mbps recovered data outputted from the clock recovery circuit 1, for example, each 5-bit, although the number of bits are not specially limited.

The expected value generating/comparator circuit 44 outputs the collation result as a 1-bit data. For example, the expected value generating/comparator circuit 44 outputs a signal which transits between the values "0" (zero) and "1" every when a 5-bit recovered data coincides with a 5-bit expected value data, as a test output. Further, the expected value generating/comparator circuit 44 is operated by a 125 MHz recovered clock outputted from the clock recovery circuit 1.

Figure 9:
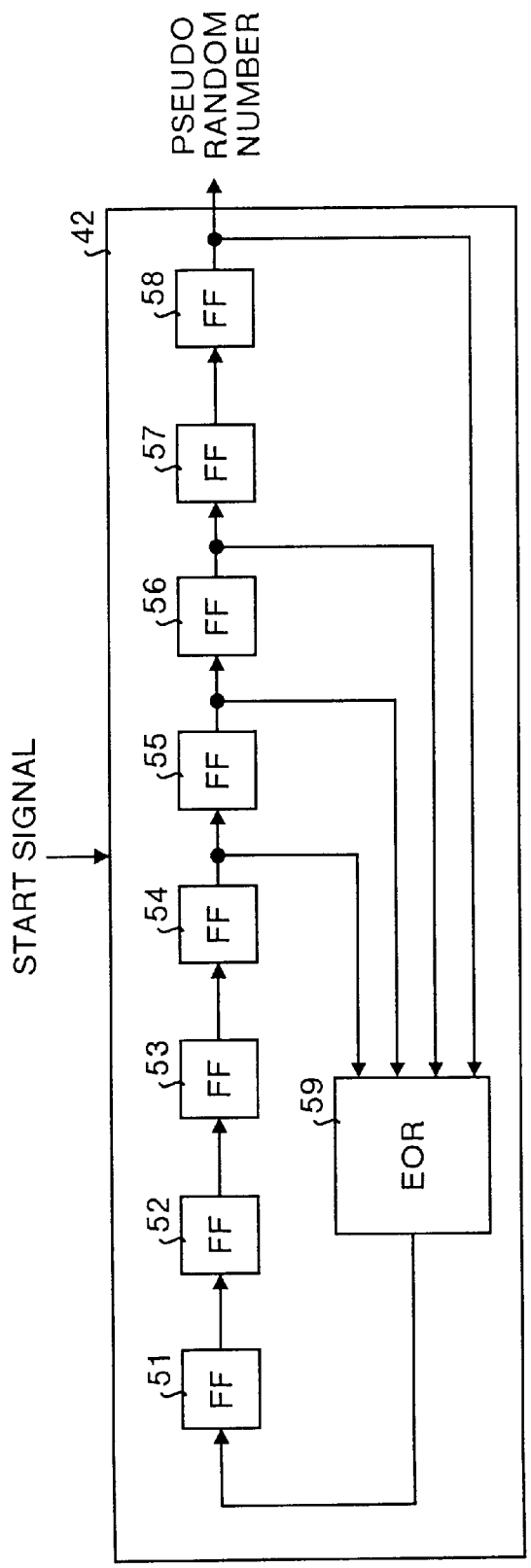
FIG. 9 is a block diagram showing a construction of a pseudo random number generating circuit of the testing system according to the second embodiment.

FIG. 9 is a block diagram showing a construction of the pseudo random number generating circuit 42. This pseudo random number generating circuit 42 comprises 8 flip-flop circuits 51, 52, 53, 54, 55, 56, 57, and 58, and an exclusive OR (EOR) circuit 59. output signal of the exclusive OR circuit 59 is input into the first flip-flop circuit 51. Output signal of the first flip-flop circuit 51 is input into the second flip-flop circuit 52.

In the same manner output signal of a flip-flop circuit is input into the next flip-flop circuit. Output signal of the last flip-flop circuit, that is the flip-flop circuit 58, is output as a pseudo random number. Each of output signals from the fourth to eighth flip-flop circuits 54, 55, 56 and 58 is input into the exclusive OR circuit 59.

This pseudo random number generating circuit 42 loads a bit string "11100010" as an initial value when a start signal is "1". In this case, the least significant bit "0" of the bit string "11100010" to be loaded is correspondent to the eighth flip-flop circuit 58.

Figure 10:
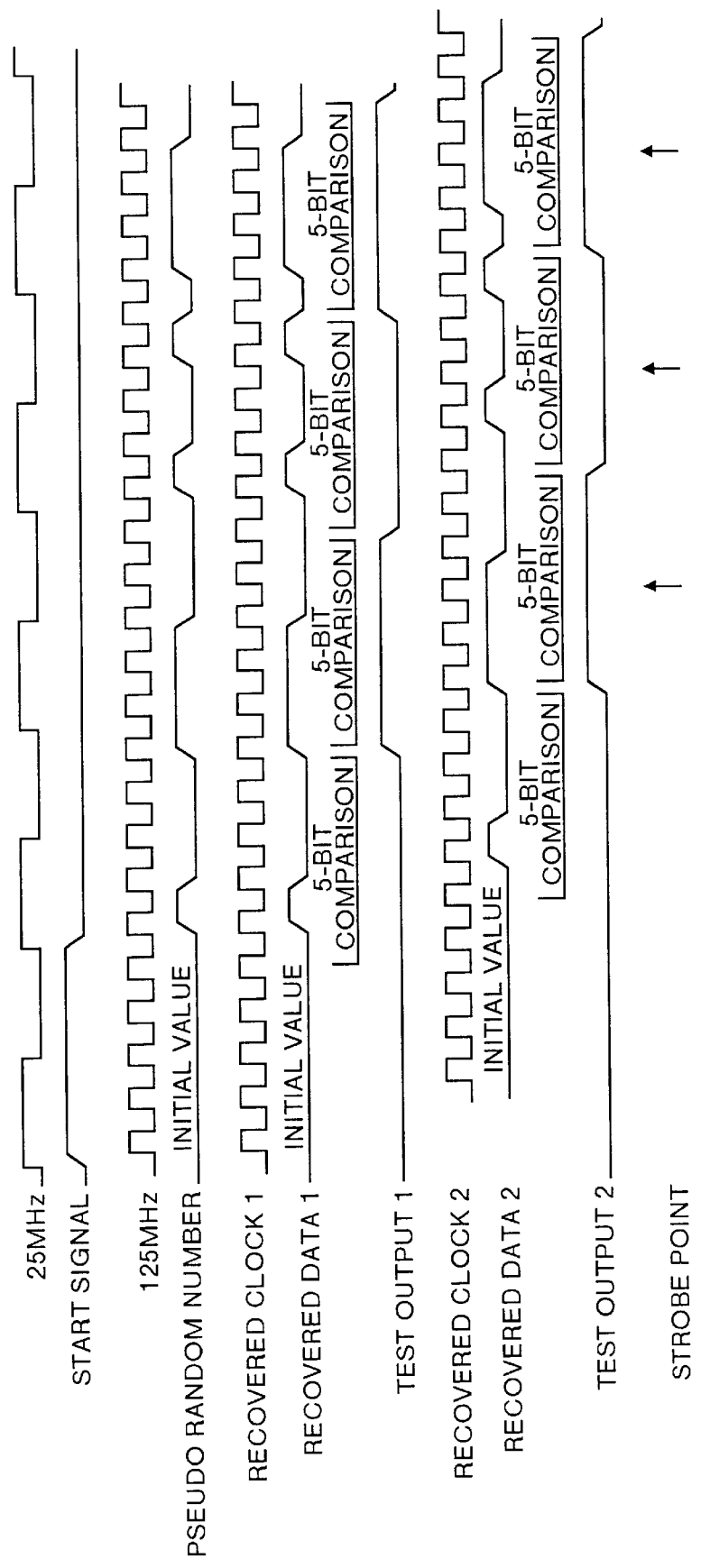
FIG. 10 is a timing chart showing a test operation timing of the testing system according to the second embodiment.

Next, operation of the testing system according to the second embodiment will be explained below. FIG. 10 is a timing chart showing a test operation timing of the testing system according to the second embodiment. FIG. 10 shows a case when the clock recovery operation is normal.

A 25 MHz clock is supplied to the clock recovery circuit 1 at a test pattern. The clock recovery circuit 1 5-muliplies the 25 MHz clock so as to generate a 125 MHz clock. A pseudo random number is generated on the basis of the 125 MHz clock. If necessary a time lag is generated by a delay control signal between the 125 MHz clock and a timing generating the pseudo random number. The pseudo random number thus generated is supplied to the clock recovery circuit 1 as a 125 Mbps data.

Then, the clock recovery circuit 1 generates and outputs a 125 MHz recovered clock and a 125 Mbps recovered data on the basis of the 25 MHz clock and the 125 Mbps data. Each of a recovered clock 1 and a recovered data 1 shows a timing in the case of being outputted at a small delay with respect to a 25 MHz clock. Each of a recovered clock 2 and a recovered data 2 shows a timing in the case where a delay is large.

When a start signal is input into the pseudo random number generating circuit 42, the pseudo random number is changed to the initial value. Further, the expected value generating/comparator circuit 44 is initialized, and the expected value is changed to the initial value. After such initialization, the 125 Mbps recovered data output from the clock recovery circuit 1 and the expected value are compared each 5 bits. The result of this comparison is output as a 1-bit test output. Therefore, the test output is a 25 Mbps data in the light of the outside of LSI. In the case shown in FIG. 10, the test output data value after initialization is "0" although it is not specially limited.

A jitter is generated in the recovered clock by the influence of the 5-multiply circuit (PLL circuit) 11 and the phase control circuit included in the clock recovery circuit 1. Accordingly, a jitter is also generated in a recovered data and a change point of test output. Therefore, expected value collation by a test pattern is carried out at a timing (strobe point: position by an arrow in the lowest portion of FIG. 10) when a test output value is settled, in order to avoid the vicinity of each change point of the test outputs 1 and 2 corresponding individually to the recovered data 1 and 2.

When the test output value transits (is shifted) between "0" and "1" every when the 5-bit recovered data coincides with the 5-bit expected value, when the clock recovery operation is in a normal state, in the test output value, "0" and "1" are alternately repeated each 5 bit of 125 Mbps. Therefore, as described above, the test output values "0" and "1" are alternately repeated, and thereby, a decision is made that the clock recovery operation is normal.

Figure 11:
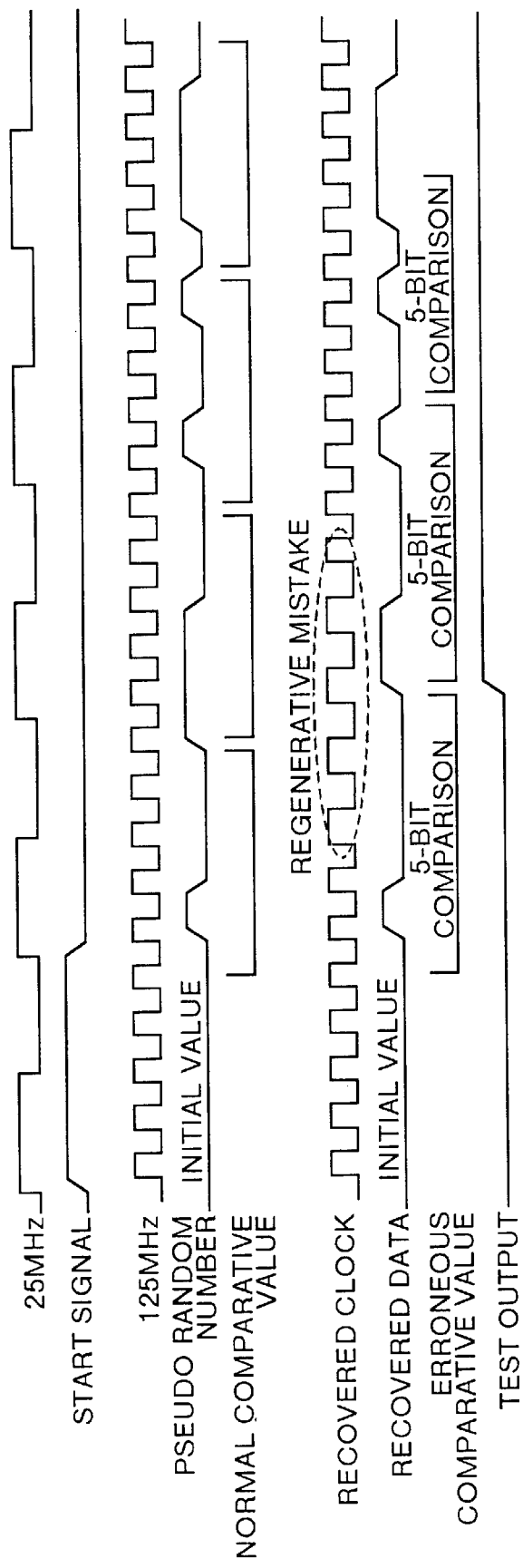
FIG. 11 is a timing chart showing a state that a clock recovery operation is abnormal in the operation timing of the testing system according to the second embodiment.

FIG. 11 is a timing chart showing a case when the clock recovery operation is abnormal in the operation timing of the testing system according to the second embodiment. When the clock recovery operation is abnormal, a 5-bit recovered data is counted on the basis of an erroneous 125 MHz recovered clock, and the 5-bit recovered data does not coincide with a 5-bit expected value data; for this reason, no transition of test output data is generated.

For example, as seen from FIG. 11, the second time expected value collation result has no coincidence by a clock regeneration mistake; for this reason, the test output value is shifted from "0" to "1", and thereafter, is left "1" because of being not shifted from "0" to "1". In the case of the test output result as described above, a decision is made that the clock recovery operation is abnormal, and thus, the LSI is decided as being defective.

According to the second embodiment, inside the of LSI, that is, the clock recovery circuit 1 and the testing system 4, the components are operated at a 125 MHz clock. However, the test output is a 25 Mbps data in the light of the outside of LSI. Further, all recovered data information are reflected in the test output; therefore, it is possible to test the 125 MHz clock recovery operation by using an LSI tester operating at 25 MHz.

It is explained a above that, the 25 MHz clock has been 5-muliplied, however, the multiplication factor is not limited to five. Further, the clock supplied to the clock recovery circuit is not limited to 25 MHz.

In the second embodiment, like the first embodiment, 10-bits are added to the 125 Mbps recovered data outputted from the clock recovery circuit, and then, the recovered data thus added may be used as a test output.

Further, it is mentioned above that the recovered data and the expected value data are compared each 5 bits. However, the number of bits to be compared may be any other form so long as it is a multiple of the multiply number. For example, even if the recovered data and the expected value data may be compared each 15 bits, the same effect as the second embodiment can be obtained. The following is a description on the case where the recovered data and the expected value data are compared each 15 bits.

Figure 12:
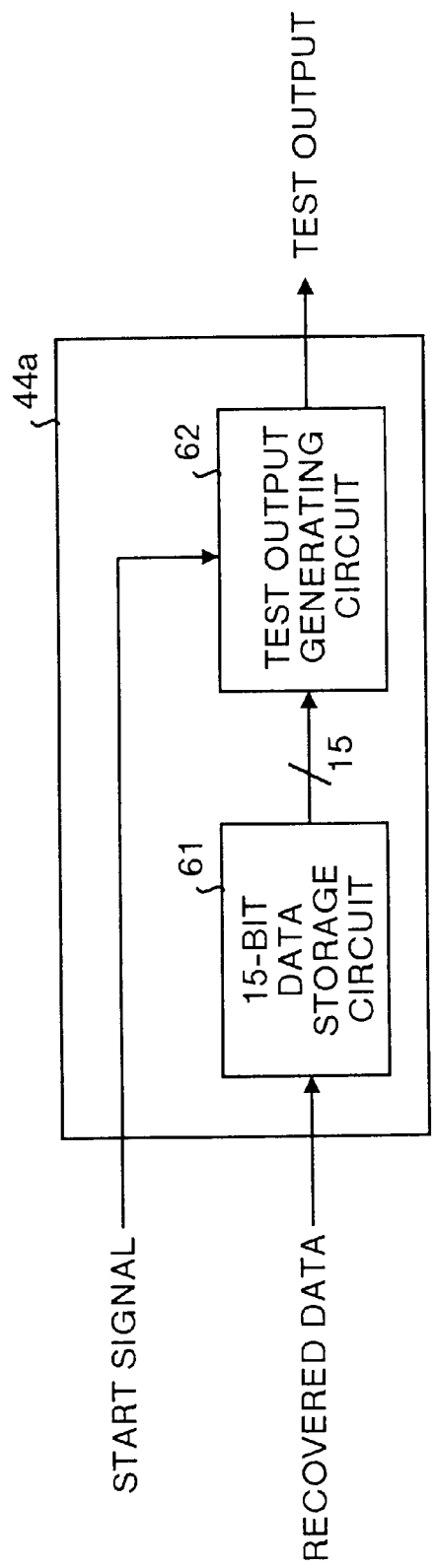
FIG. 12 is a block diagram showing a construction of an expected value generating/comparator circuit in the case of comparing a recovered data with an expected value each 15 bits in the second embodiment.

FIG. 12 is a block diagram showing a construction of an expected value generating/comparator circuit when 15 bits of recovered data and expected value are compared each time. An expected value generating/comparator circuit 44a includes a 15-bit data storage circuit 61 for holding a past 15-bit recovered data, and a test output generating circuit 62.

The test output generating circuit 62 is initialized by a start signal synchronizing with a 25 MHz clock. For example, the test output generating circuit 62 outputs a value "0" as a test output when the start signal is "1". Further, the test output generating circuit 62 outputs a value "0" or "1" as a test output when a 15-bit recovered data held in the 15-bit data storage circuit 61 coincides with a bit string of an expected value. The expected value data is already known.

FIG. 13 is a table showing a relation between a 15-bit recovered data and a test output of the test output generating circuit 62. When the input 15-bit recovered data coincides with any of data strings shown in the table of FIG. 13, a test output value is output in accordance with the data string. When the 15-bit recovered data has no coincidence with any data strings, the previous value is outputted as the test output. In this case, when the start signal is "1", a value "0" is preferentially outputted as a test output.

In FIG. 13, when a bit string of test output pattern is "10110010110010110", a decision is made that a clock recovery operation is normal. In FIG. 13, a left-hand bits of the 15-bit recovered data is an old data.

Figure 14:
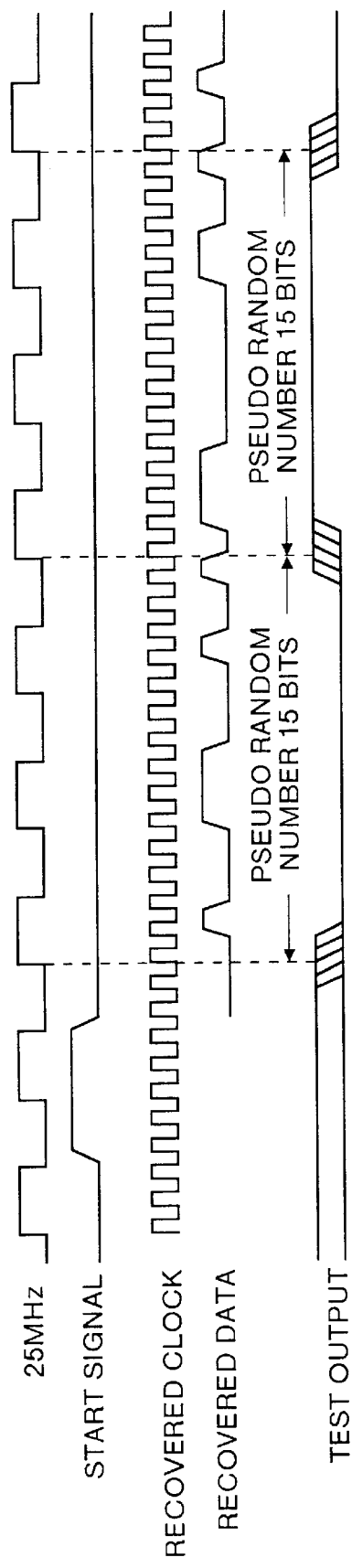
FIG. 14 is a timing chart showing a test output timing directly after a start signal is inputted, in the case of comparing a recovered data with an expected value each 15 bits.

Further, in the case of making a comparison each 15 bits, the following is a description on the case where a pseudo random number generating circuit comprises a 8-bit shift register as shown in FIG. 9. The pseudo random number generating circuit generates a random number such that the same bit string is repeated at a unit of 255 bit. Therefore, when making a comparison of the recovered data at a unit of 15 bits, the same test patter is outputted each 17 cycle. FIG. 14 and FIG. 15 show the test output pattern.

FIG. 14 is a timing chart showing a test output timing directly after a start signal is input. FIG. 15 is a timing chart showing the whole period of a pseudo random number output from the pseudo random number generating circuit.

According to the present invention, the clock recovery circuit and the testing system included in the LSI are operated by a high frequency clock; however, a test output is a low speed data in the light of the outside of LSI. All recovered data information are reflected in the test output. Therefore, it is possible to test a clock recovery operation of generating a high frequency clock by using an LSI tester operating at a low frequency clock.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A testing system comprising:
   a clock recovery unit receiving a low frequency clock and input data having continuous bits, generating a high frequency clock by multiplying the low frequency clock, and recovering high rate data on a basis of the high frequency clock and the input data; and
   testing unit testing the recovered high rate data without using the input data, and outputting a result of the testing.

2. The testing system according to claim 1, wherein the bits have a number of bits equivalent to a multiplication factor or a multiple of the low frequency clock in the clock recovery unit.

3. The testing system according to claim 2, wherein the frequency of the low frequency clock is 25 MHz, the high rate data is a 125 Mbps data having the same value each 5 bits, the multiplication factor is equal to 5, and the recovered high rate data is added each 10 bits.

4. The testing system according to claim 1, wherein the testing system is provided in a same LSI as the clock recovery unit.

5. A testing system comprising:
   a clock recovery unit receiving a low frequency clock and input data having continuous bits, generating a high frequency clock by multiplying the low frequency clock, and recovering high rate data on a basis of the high frequency clock and the input data; and
   an output unit adding the continuous bits and outputting the added continuous bits.

6. The testing system according to claim 5, wherein the bits have a number of bits equivalent to a multiplication factor or a multiple of the low frequency clock in the clock recovery unit.

7. The testing system according to claim 6, wherein the frequency of the low frequency clock is 25 MHz, the high rate data is a 125 Mbps data, the multiplication factors is equal to 5, the number of bits collating the recovered high rate data with the expected value data is 5 bits, and a test output to the 5-bit collation is a 1-bit data.

8. The testing system according to claim 6, wherein the frequency of the low frequency clock is 25 MHz, the high rate data is a 125 Mbps data, the multiplication factors is equal to 5, the number of bits collating the recovered high rate data with the expected value data is 15 bits, and a test output to the 15-bit collation is a 1-bit data.

9. The testing system according to claim 5, further comprising:
   a pseudo random number generating unit generating the high rate data on a basis of the high frequency clock.

10. The testing system according to claim 5, wherein testing system is provided in a same LSI as the clock recovery unit.

11. A testing system to test whether a circuit has fault or not, wherein the circuit receives a low frequency clock and a high rate data, and recovers a high frequency clock and the high rate data on a basis of the received low frequency clock and the high rate data, the testing system comprising:
    a unit testing a validity of the recovered high rate data and outputting test signals less than, a number of signals of the recovered high rate data.

12. The testing system according to claim 1, wherein the testing unit adds a plurality of bits of the high rate and outputs the added bits as the result of the testing.

13. The testing system according to claim 1, wherein the testing unit comprises an edge detecting unit detecting a change in the high rate data and outputting an enable signal indicative thereof.

14. The testing system according to claim 13, wherein the testing unit comprises a memory circuit outputting a test output in accordance with the enable signal.

15. The testing system according to claim 1, wherein the testing unit comprises:
    a delay circuit storing the high rate data; and
    an adder circuit receiving the high rate data from the delay circuit and adding a plurality of bits of the high rate data.

16. The testing system according to claim 1, wherein the continuous bits have a same value in a range.

17. The testing system according to claim 5, wherein the output unit comprises an edge detecting unit detecting a change in the high rate data and outputting an enable signal indicative thereof.

18. The testing system according to claim 17, wherein the output unit comprises a memory circuit outputting a test output in accordance with the enable signal.

19. The testing system according to claim 5, wherein the output unit comprises:
    a delay circuit storing the high rate data; and
    an adder circuit receiving the high rate data from the delay circuit and adding a plurality of bits of the high rate data.

20. The testing system according to claim 5, wherein the continuous bits have a same value in a range.

21. A testing method, comprising:
    receiving a low frequency clock and input data having continuous bits;
    generating a high frequency clock by multiplying the low frequency clock;
    recovering high rate data on a basis of the high frequency clock and the input data;
    testing the high rate data without using the input data; and
    outputting a result of the testing.

22. A testing method, comprising:
    receiving a low frequency clock and input data having continuous bits;
    generating a high frequency clock by multiplying the low frequency clock;
    recovering high rate data on a basis of the high frequency clock and the input data;
    adding the continuous bits; and
    outputting the added continuous bits.

* * * * *

UNITED STATES PATENT AND TRADEMARK OFFICE
CERTIFICATE OF CORRECTION

PATENT NO.    : 6,798,831 B1
DATED         : September 28, 2004
INVENTOR(S)   : Koichi Hatta It is certified that error appears in the above-identified patent and that said Letters Patent is hereby corrected as shown below:

<u>Column 10,</u>
Line 14, delete ","

Signed and Sealed this

Twenty-fourth Day of May, 2005

JON W. DUDAS
*Director of the United States Patent and Trademark Office*